July 22, 1969  K. ŠTĚPÁNEK ET AL  3,456,523
MECHANICAL CONTROL STRUCTURE
Filed Sept. 13, 1967  2 Sheets-Sheet 2
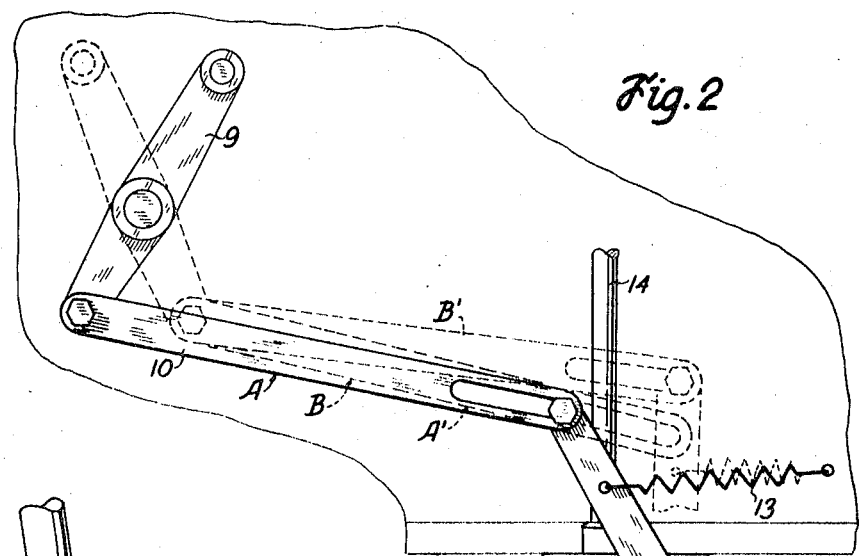
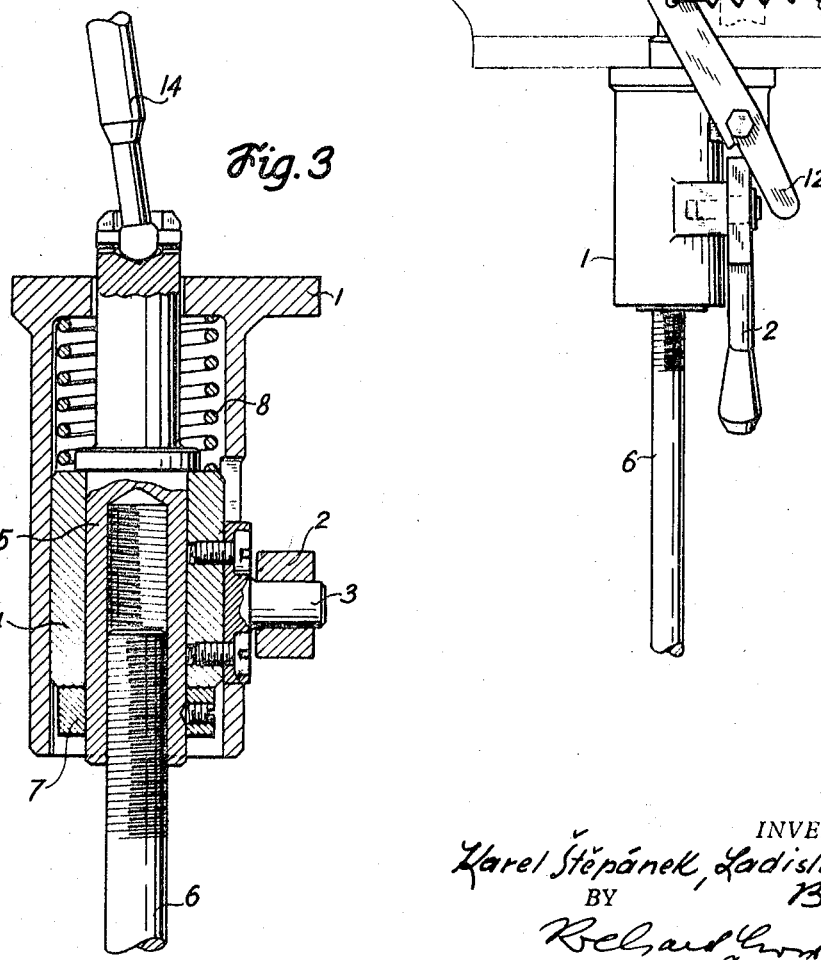
INVENTORS
Karel Štěpánek, Ladislav Burda
BY
Richard Low
Ag't __United States Patent Office__

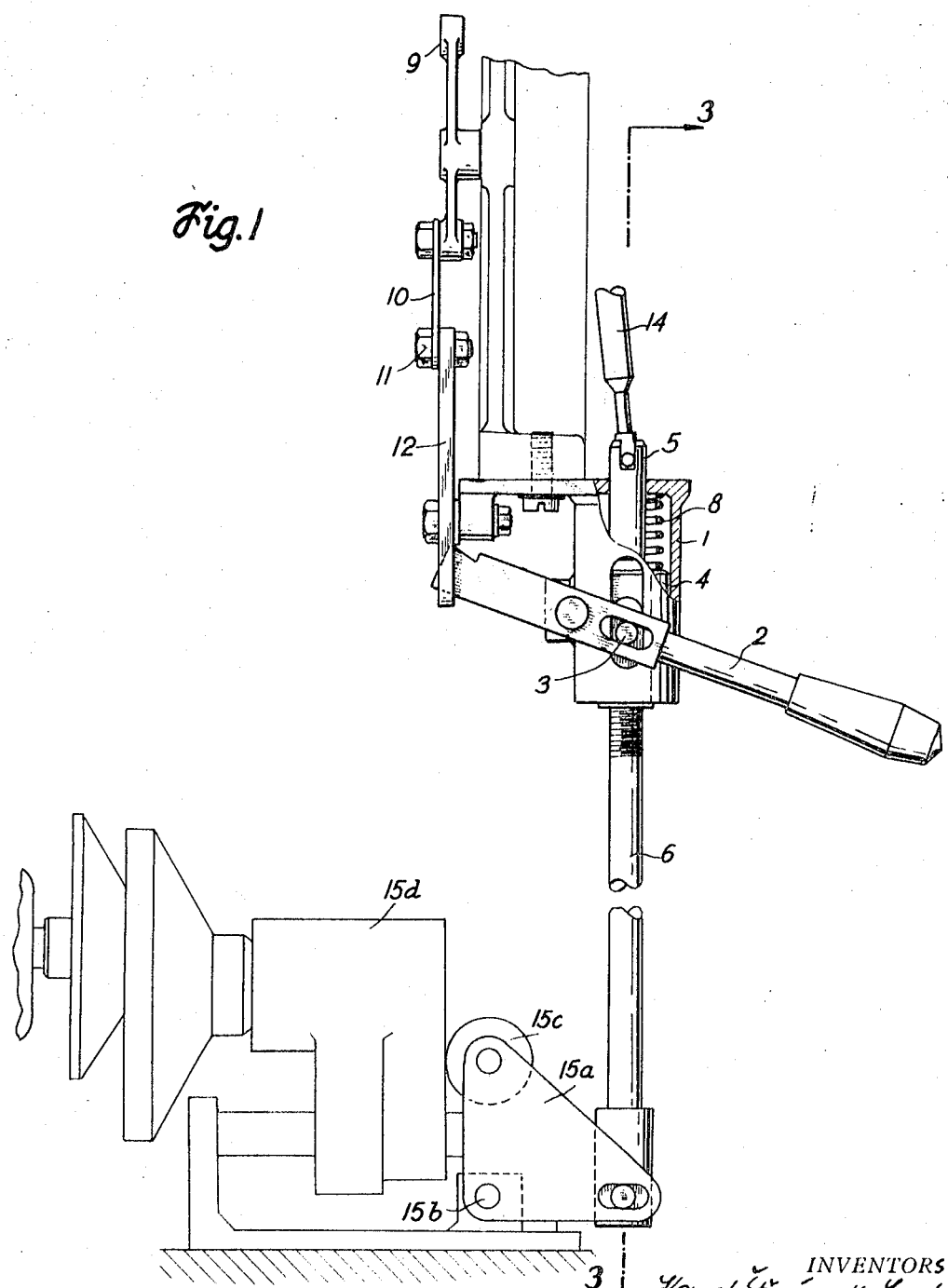

3,456,523
Patented July 22, 1969

3,456,523
MECHANICAL CONTROL STRUCTURE
Karel Štěpánek, Drnovice, and Ladislav Burda, Prague,
Czechoslovakia, assignors to Adamovske Strojirny na-
rodni Podnik, Adamor, Czechoslovakia
Filed Sept. 13, 1967, Ser. No. 667,558
Int. Cl. G05g 11/00; F16h 1/18
U.S. Cl. 74—479                    10 Claims

ABSTRACT OF THE DISCLOSURE

In the control of the position of an element by way of a pair of positioning structures which are independent of each other, the pair of positioning structures may be actuated automatically and manually, respectively. These positioning structures as well as the element whose position is to be controlled are interconnected through an assembly which enables each positioning structure to control the position of the element independently of the other positioning structure.

Background of the invention

The present invention relates to mechanical control structures.

In particular, the invention relates to control structures which are required mechanically to control the position of a controlled element in response to different sources of adjustment.

For example, the invention can be used in printing machines for automatically reducing the speed of rotation of components thereof whenever the printing operations are interrupted.

Known structures of this general type may take the form, for instance, of electric servo-motors capable of regulating a speed-changing structure, so that in this way it becomes possible to control the speed of rotation of components of a machine such as a printing press. In the case of relatively small printing presses, however, such automatic controls are not provided, and structures such as those which feed the sheets and convey the latter are not stopped when the printing operations are interrupted.

Thus, the conventional structures of the above general type have several disadvantages. Either they are extremely complex and expensive and require a large amount of space in order to achieve the desired controls, thus also undesirably increasing the weight of the structure, or if the structure is a smaller printing press of the type referred to above, various mechanisms operate continuously even during an interruption in the output of the machine so that there is an undesirably large working load, and because of the continuous operations maintenance and inspection of the machine is difficult.

Summary of the invention

It is a primary object of the present invention to provide a control structure of the above stated general type which is fully mechanical and exceedingly simple so that it is light in weight, inexpensive, and highly reliable in operation.

One object of the invention is to provide a control structure of this type, which is particularly adapted for use in the automatic control of a printing press so that, for example, when there is an interruption in the printing operations the rotary movement of components of the press automatically takes place at a reduced speed.

In addition, it is an object of the present invention to provide a control structure which lends itself to continuous control of the speed of operation of the machine components.

Also, the objects of the present invention include the provision of a structure which will be capable of providing a rapid increase in the speed of rotation of components of a machine up to a given operating speed.

It is in particular an object of the invention to provide a construction which will enable machines of the referred to type to have parts thereof set into rotation and increase in speed up to a maximum rotary speed while reliably avoiding any shocks.

With the control structure of the invention there is a controlled element whose position is to be controlled and a pair of positioning means for respectively determining the position of the controlled element. A connecting means of the invention connects both of these positioning means to each other and to the controlled element for providing for a determination of the position of the latter by way of one of the positioning means without disturbing in any way the other positioning means, while at the same time providing for a determination of the position of the controlled element by the other positioning means without influencing the position of the controlled element as determined by the one positioning means.

Brief description of the drawings

Our invention is illustrated by way of example in the accompanying drawings which form part of this application and in which:

FIG. 1 is a side elevation of a control structure of the invention, showing schematically parts which are controlled by the structure of the invention;

FIG. 2 is an elevation of the structure of FIG. 1, seen from the left of FIG. 1; and FIG. 3 is a longitudinal sectional elevation taken in the plane of the line 3—3 of FIG. 1, showing the connecting means of the invention in detail.

Description of a preferred embodiment

Referring now to the drawings in greater detail, the structure illustrated therein includes an outer cylinder 1 which has a vertical axis, as viewed in the drawings. Cylinder 1 is stationary and is fixedly mounted on the machine frame as, for example, in the manner indicated in FIG. 1. This outer cylinder slidably accommodates in its interior an intermediate sleeve 4 which is guided for axial movement in the cylinder 1. The cylinder 1 is formed with an axial slot that receives a projection 3 which is fixed to the intermediate sleeve 4. This projection 3 may take the form, for example, of a headed pin having its head end situated within the axial slot to be slidable therealong. This head end of the projection 3 is fixed directly to the intermediate sleeve 4 by a pair of screws such as those visible in FIG. 3, and the outer end of the projection 3 is situated at the exterior of the cylinder 1, as indicated in the drawings. An inner rotary member in the form of a shaft 5 extends through the intermediate sleeve 4 and is turnable in the latter about the common axis of the shaft 5 and the sleeve 4, this common axis coinciding with the axis of the cylinder 1. As is apparent from FIG. 3, the shaft 5 fixedly carries intermediate its ends a collar engaging the top end of the intermediate sleeve 4, and beneath the latter the shaft 5 fixedly carries a collar 7 which slidably engages the bottom end of the intermediate sleeve 4 so that in this way the sleeve 5, while it can rotate within the sleeve 4, cannot move axially with respect thereto. A spring 8 is housed within the cylinder 1 and is coiled about the upper portion of the shaft 5 which extends upwardly beyond the sleeve 4. At its opposite ends the spring 8 presses against a top wall of the cylinder 1 and the top end of the sleeve 4 so as to urge the projection 3 to the bottom end of the axial slot of the cylinder 1.

The structure of the invention as thus far described forms a connecting means for connecting a pair of positioning means to each other as well as to a controlled element 6 the position of which is to be determined by the structure of the invention. This controlled element 6 is in the form of an elongated control rod having a top end which is threaded into a tapped bore of the inner rotary member 5 that extends upwardly into the latter from its bottom end. The element 6 is prevented from turning about its axis so that in response to rotary movement of the inner member 5 the axial position of the controlled element 6 will be changed. As may be seen from FIG. 1, the controlled element 6 may turn, as its axial position changes. A bell crank 15a which has a stationary pivot 15b and carries a controlled roller 15c engages part of a unit 15d which may be a speed-changing mechanism of any known type capable of continuously changing the speed of rotary movement of components of a machine such as a printing press in response to axial displacement of the unit 15d as a result of swinging the roller 15c about the pivot 15b.

One of the positioning means which is connected to the controlled element 6 by the connecting means is fragmentarily illustrated as taking the form of an elongated rod 14 that has a lower spherical end from which a pair of projections extend at diametrically opposed parts of the spherical bottom end of the control rod 14. These projections are fixed to the spherical bottom end of the rod 14 and are received in axial notches at the top end of the rotary member 5. These notches communicate with an axial bore which extends downwardly into the rotary member 5 from the top end thereof and which has a conical bottom end on which the spherical end of the positioning means 14 is seated. The top wall of the cylinder 1 is formed with an opening through which the inner rotary member 5 freely extends, as shown. The upper portion of the positioning means 14, which is not illustrated, may have a splined or keyed connection with the hub of a bevel gear with respect to which the rod 14 is axially shiftable, while through this splined or keyed connection the rod 14 is prevented from turning with respect to such a bevel gear. The bevel gear meshes with a second bevel gear which through a suitable transmission is capable of being manually turned from a suitable control knob or the like so that when this latter knob is actuated by the operator, in connection with a suitable scale, for example, from a suitable control panel or the like, it is possible to determine the axial position of the controlled element 6. Thus, in response to rotation of the positioning means 14, the inner rotary member 5 will necessarily be turned so that the controlled element 6 will be threaded further into or further out of the rotary member 5 which cannot be axially displaced with respect to the intermediate sleeve 4 so that in this way the position of the controlled element 6 is determined by the aforesaid one positioning means 14 without in any way influencing the other positioning means which is described below and which is connected to the connecting means at the projection 3 thereof.

The other positioning means responds automatically to the operation of the machine, and in the case of a printing press, such as an offset printing press, the other positioning means may respond to movements of the printing cylinders between operative and inoperative positions, this latter movement being accompanied in a known way by starting and stopping, respectively, of the feed of the sheets which are to be printed. A machine of this latter type which can be used in connection with the other positioning means described below is shown, for example, in U.S. Patent 3,046,881.

This other positioning means includes a train of transmission elements including an input lever 9 supported for swinging movement about a stationary axis on any suitable stationary pin carried by the machine frame. This input lever 9 is swingable about an axis which is situated between the ends of the lever 9, as indicated in FIGS. 1 and 2. The top end of the lever 9, as seen in FIG. 2, may be connected through a suitable linkage with structure to be used with a machine such as the one shown in the above indicated patent so that the lever 9 will swing in response to starting and stopping of the printing operations and, of course, also in response to the accompanying starting and stopping of the feeding of the sheets.

The transmission which forms this other positioning means of the invention terminates in an output lever 2 which is supported intermediate its ends for swinging movement about a predetermined turning axis directly on a portion of the cylinder 1 at the exterior thereof, and on one side of its turning axis the output lever 2 is formed with a longitudinal slot that receives the projection 3, as shown most clearly in FIG. 1.

An intermediate transmission lever 12 is supported intermediate its ends for swinging movement about a stationary axis, whereby the mounting of the intermediate transmission lever 12 is also provided directly at a part of the cylinder 1. As may be seen from FIG. 1, that portion of the cylinder 1 which is directly connected to the machine frame also fixedly carries a block on which the intermediate transmission lever 12 is mounted for swinging movement. The lower end of this lever 12 extends across and engages the end of the output lever 2 which is to the left of its turning axis, as viewed in FIG. 1. The upper edge of the lever 2 is notched adjacent its upper end, as indicated in FIG. 1, so as to coact with the intermediate transmission lever 12 whose turning axis is perpendicular to the turning axis of the output lever 2. The spring 8 will maintain the lever 2 in the position indicated in FIG. 1. It will be noted that a spring 13 (FIG. 2) is connected with the intermediate transmission lever 12 to urge the latter in a clockwise direction, as viewed in FIG. 2, so that in response to the force of the spring 13 the lower end of the lever 12 will slide along the upper edge of the outward lever 2 in the notch thereof to swing lever 2 in a counter-clockwise direction (see FIG. 1), so as to raise the intermediate sleeve 4 in opposition to the spring 8 and thus alter the position of the controlled element 6 which necessarily moves axially with the intermediate sleeve 4. The force exerted by way of the spring 13 and the lever 12 is superior to that exerted by the spring 8 so that when the lever 12 is released, in a manner described below, to turn in a clockwise direction from its solid line position indicated in FIG. 2 the sleeve 4 will be raised.

This transmission which forms the other positioning means of the invention includes a link 10 that is pivotally connected at its left end, as shown in FIG. 2, to the bottom end of the input lever 9. At its right end the link 10 is connected to the top end of the intermediate transmission lever 12. The pivotal connection to the lever 12 to the link 10 is also capable of providing a longitudinal displacement of the link 10 with respect to the lever 12. For this purpose the lever 12 fixedly carries at its top end a pin 11 which extends through and is axially slidable along a longitudinal slot that is formed in the link 10.

In response to tripping of the pressure of the printing cylinders on and off, in the manner disclosed in the above referred to patent, the lever 9 will be turned. Through the one positioning means 14 it is possible to initially set the position of the controlled element 6 so as to provide through the speed change mechanism shown at the lower part of FIG. 1 a given selected speed of rotation of the components of a machine such as a printing press, such as a speed within a range of 1000–5000 rotations per hour. At a speed within this latter range it is possible to start feeding of the sheets which are to be printed and to start the operation of additional conveying mechanisms without risking any undesirable shocks in these mechanisms. These latter mechanisms coact with the input lever 9 of the other positioning means to turn the latter from the solid to the dotted line position indicated in FIG. 2, with the result that the link 10 is longitudinally shifted from position A to position B, the link 10 being free to ride along the pin 11 which extends through the longitudinal slot at the right end of the link 10. However, this movement of the link 10 releases the intermediate transmission lever 12 to the force of spring 13 which thus now swings the lever 12 in a clockwise direction, as viewed in FIG. 2, and thus the top end of the intermediate transmission lever 12 is displaced from the position A' to the position B' indicated in FIG. 2. As a result the lower end of the lever 12 slides along the upper edge of the upward lever 2 turning the latter in opposition to the spring 8 in a counter-clockwise direction, seen in FIG. 1, so as to elevate the controlled element 6 without disturbing the initial axial position thereof as determined by the positioning means 14. Such raising of the controlled element 6 brings about an automatic movement of the speed-control structure shown at the bottom of FIG. 1, providing, for example, an increase in the speed of rotation of the components of the machine. In the case of a printing press, such a movement of the controlled element 6 can bring about an increase of the rotary speed of the machine components on the order of 3000 rotations per hour so that the speed of rotation will be increased from 5000 to 8000 rotations per hour.

When the printing operations are interrupted for any reason the lever 9, through a nonillustrated mechanism the controls of which will be derived from a structure such as that shown in the above mentioned patent will automatically return to its initial solid line position indicated in FIG. 2 so as to displace the bottom end of the lever 12 from its position resting against the top edge of the output lever 2 to the position shown in FIG. 2, in opposition to the spring 13, where the intermediate lever 12 extends downwardly across the upper edge of the lever 2. In this way the spring 8 is released and expands to lower the controlled element 6 to its initial position, providing in this way the lower speed of rotation as determined by the preliminary setting provided through the positioning means 14. In the above referred to example, this will bring about a reduction in the speed of rotation of machine components from 8000 rotations per hour to 5000 rotations per hour.

As is apparent from FIGS. 1 and 2, the output lever 2 carries at an end distant from the intermediate lever 12 a handle which enables the operator at any time to manually turn the output lever 2 in a counter-clockwise direction in opposition to the spring 8 so that in this way the operator can at any time increase the speed of rotation of the machine components, as when setting the machine up. In this way a manually operable means is provided also for determining the position of the controlled element 6.

It should be understood that the foregoing disclosure relates only to a preferred embodiment of the invention and that it is intended to cover all changes and modifications of the embodiment chosen herein for the purpose of the disclosure, which do not depart from the scope and spirit of the invention as set forth in the appended claims.

We claim:

1. In a mechanical control structure, a controlled element whose position is to be controlled, a pair of positioning means for respectively determining the position of said controlled element, and connecting means connecting said pair of positioning means to each other and to said controlled element, and including an inner rotary member threadedly connected with said element for axially positioning the latter in response to turning of said inner rotary member, said inner rotary member being operatively connected with one of said positioning means to be turned thereby while being axially displaceable with respect to one positioning means, and said connecting means including an outer sleeve surrounding said inner member and being axially immovable with respect thereto while said inner member is free to rotate within said sleeve, the other of said positioning means being operatively connected to said sleeve of said connecting means for axially displacing said sleeve together with said inner rotary member and said element, so that when the position of said element is changed by said other positioning means the relative position between said inner rotary member and said elements does not change.

2. The combination of claim 1 and wherein said other positioning means is an operation-responsive positioning means for determining the position of said controlled element in response to operation of a machine.

3. In a mechanical control structure, a controlled element whose position is to be controlled, a pair of positioning means for respectively determining the position of said controlled element, and connecting means connecting said pair of positioning means to each other and to said controlled element for transmitting movement of one of said positioning means to said controlled element to change the position thereof without influencing the other of said positioning means, and for changing the position of said controlled element by said other positioning means without influencing the position of said controlled element as determined by said one positioning means, said connecting means including an inner rotary member operatively connected to said one positioning means to be rotated thereby, said inner rotary member having a threaded connection with said controlled element, said controlled element being movable only axially of said inner rotary member so that in response to rotation of the latter by said one positioning means the axial position of said controlled element will be determined, said connecting means further including an intermediate sleeve surrounding said inner rotary member and in which said rotary member is turnable, means restraining said inner rotary member against axial movement with respect to said intermediate sleeve while being free to rotate with respect thereto, said connecting means further including a guide means guiding said intermediate sleeve for axial movement but preventing said intermediate sleeve from turning, said guide means including an outer cylinder coaxially surrounding and slidably engaging said intermediate sleeve, and being formed with an axial slot, said connecting means also including a projection fixed to said intermediate sleeve and extending through said slot to the exterior of said cylinder, said other positioning means being operatively connected to said projection at the exterior of said cylinder for shifting said projection and said intermediate sleeve along said slot so as to provide for axial displacement of said controlled element to further determine the axial position thereof.

4. The combination of claim 3 and wherein said other positioning means includes a mechanical transmission composed of an input lever having a stationary turning axis and being adapted to be actuated by the machine which is to be regulated, an output lever also having a stationary turning axis and being formed on one side of the latter axis with a longitudinal slot in which said projection is located, an intermediate transmission lever also having a stationary turning axis and engaging said output lever at the side of said turning axis thereof opposite from said slot thereof for turning said output lever upon turning of said intermediate transmission lever so as to axially move said intermediate sleeve in said cylinder, and a link extending between and pivotally connected with said input lever and said intermediate transmission lever.

5. The combination of claim 4 and wherein said link is formed distant from said input lever with a longitudinal slot, said intermediate transmission lever having at a side of its turning axis opposite from said output lever a pin received in said slot of said link, and a spring connected to said intermediate transmission lever for maintaining said pin at an end of said slot of said link which is distant from said input lever.

6. The combination of claim 5 and wherein a spring is situated in said cylinder and acts on said intermediate sleeve for urging said projection to one end of said cylinder slot.

7. The combination of claim 6 and wherein said inner rotary member extends through and beyond said cylinder and terminates in an outer end situated at the exterior of said cylinder, said outer end of said inner rotary member being formed with a recess extending into said rotary member and said one positioning means extending into said recess and being connected therein to said inner rotary member for turning the latter while being axially movable therewith.

8. The combination of claim 5 and wherein said output lever is pivotally connected directly to a portion of said cylinder.

9. The combination of claim 8 and wherein said intermediate transmission lever is also pivotally connected directly to said cylinder, and the turning axis of said intermediate transmission lever is perpendicular to the turning axis of said output lever.

10. The combination of claim 4 and wherein said output lever carries a handle at a portion thereof on the same side of said turning axis thereof as said slot so that by engaging said handle said output lever can be manually turned for bringing about manual displacement of said with so as to provide in this way manual shifting of said intermediate sleeve and said inner rotary member therecontrolled element whenever desired.

References Cited

UNITED STATES PATENTS

| 2,315,260 | 3/1943 | Lancaster | 74—479 |
| 2,375,172 | 5/1945 | Arter | 74—424.8 |
| 2,590,745 | 3/1952 | Wüensch | 74—625 |
| 2,932,978 | 4/1960 | Newberry | 74—479 |

FRED C. MATTERN, Jr., Primary Examiner

W. S. RATLIFF, Jr., Assistant Examiner

U.S. Cl. X.R.

74—424.8